United States Patent
Barabash et al.

(10) Patent No.: US 7,321,908 B2
(45) Date of Patent: Jan. 22, 2008

(54) MOSTLY CONCURRENT GARBAGE COLLECTION

(75) Inventors: Katherine Barabash, Haifa (IL); Yoav Ossia, Haifa (IL); Erez Petrank, Haifa (IL)

(73) Assignee: International Business Machines Corporational, Armonk, NY (US)

(*) Notice: Subject to any disclaimer, the term of this patent is extended or adjusted under 35 U.S.C. 154(b) by 423 days.

(21) Appl. No.: 10/625,048

(22) Filed: Jul. 23, 2003

(65) Prior Publication Data

US 2005/0021576 A1 Jan. 27, 2005

(51) Int. Cl.
*G06F 12/00* (2006.01)
*G06F 17/30* (2006.01)
(52) U.S. Cl. .......... 707/206; 711/148
(58) Field of Classification Search .......... 707/206; 711/148
See application file for complete search history.

(56) References Cited

U.S. PATENT DOCUMENTS

| | | | |
|---|---|---|---|
| 5,948,113 A * | 9/1999 | Johnson et al. | 714/38 |
| 6,052,699 A * | 4/2000 | Huelsbergen et al. | 707/206 |
| 6,098,089 A * | 8/2000 | O'Connor et al. | 718/104 |
| 6,571,260 B1 * | 5/2003 | Morris | 707/206 |
| 2001/0000821 A1 * | 5/2001 | Kolodner et al. | 711/170 |

OTHER PUBLICATIONS

Printezis et al. "Generational Mostly-concurrent Garbage Collector" Jun. 2000, Sun Microsystems, pp. 1-30.*
Barabash et al. "A Parallel, Incremental, Mostly Concurrent Garbage Collector for Servers" Jan. 1999, IBM Haifa research lab, pp. 1-49.*
Barabash, Katherine, et al., "Mostly Concurent Garbage Collection Revisited", *OOPSLA* '03, Oct. 26-30, 2003, Anaheim, CA.

* cited by examiner

*Primary Examiner*—Hosain Alam
*Assistant Examiner*—Usmaan Saeed

(57) ABSTRACT

A method for collecting garbage in a computing environment, the method including tracing root objects to their reachable objects in a population of objects, marking the traced objects, unmarking a marked card including any of the objects, tracing any marked object on the unmarked card to an unmarked referent object of the marked object, marking the unmarked referent object, and tracing the marked referent object to its reachable objects, concurrently with the operation of a mutator upon the population of objects within the computing environment, and, while no mutator operates upon the population of objects within the computing environment, marking the traced objects, tracing unmarked root object referents to their reachable objects, marking any of the objects, and designating any unmarked object in the population of objects as available for reallocation.

20 Claims, 7 Drawing Sheets

MOSTLY CONCURRENT GARBAGE COLLECTION

FIELD OF THE INVENTION

The present invention relates to garbage collection in computing environments in general, and in particular to concurrent mark-and-sweep garbage collection techniques.

BACKGROUND OF THE INVENTION

Garbage collection techniques for use in computing environments are well known. In mark-and-sweep garbage collection, an object connectivity graph is traced from root objects to all their referents and their descendents (i.e., all objects "reachable" from root objects) in an object population, with all traced objects assumed to be in use and marked as such. Unmarked objects are assumed to be not in use and are made available for reallocation. In concurrent mark-and-sweep garbage collection, object tracing and marking is performed in parallel with the operation of an executing program or process, referred to as a mutator. Since the object connectivity graph may be modified by the mutator while the collector traverses from object to object, a write barrier is generally employed by the mutator to record locations of object references that it modifies. Typically, objects are grouped into cards which the mutator marks if it modifies an object reference on a card. Objects on marked cards are then retraced by the collector during a process referred to as card cleaning in order to ensure that all reachable objects are marked.

While object tracing and card cleaning may be executed in parallel with the operation of the mutator, a card may be marked at any time, including while it is being cleaned or immediately thereafter. Therefore, to ensure correctness, all computing processes are periodically suspended with the exception of the garbage collector which then cleans all marked cards and traces the object connectivity graph from unmarked root objects, ensuring that all reachable objects are marked. However, the "stop-the-world" suspension of all processing is often disruptive to processing flow and should therefore be performed as infrequently and quickly as possible. Furthermore, the concurrent operation of the garbage collector may slow down the application threads due to the amount of system resources it needs. Thus, an improved concurrent garbage collection technique that minimizes the frequency and duration of "stop-the-world" garbage collection while requiring less system resources would be advantageous.

SUMMARY OF THE INVENTION

In one aspect of the present invention a method is provided for collecting garbage in a computing environment, the method including a) tracing a root object to any of its reachable objects in a population of objects, b) marking any of the objects referred to in step a), c) unmarking a marked card including any of the objects, d) tracing any marked object on the unmarked card to an unmarked referent object of the marked object, e) marking the unmarked referent object, f) tracing the referent object marked in step e) to any of its reachable objects, g) marking any of the objects referred to in step f), h) tracing any unmarked root object referent to any of its reachable objects, i) marking any of the objects referred to in step h), j) performing any of steps c)-g), and k) designating any unmarked object in the population of objects as available for reallocation, where any of steps a)-g) are performed upon the population of objects concurrently with the operation of a mutator upon the population of objects within the computing environment, and where any of steps h)-k) are performed upon the population of objects while no mutator operates upon the population of objects within the computing environment.

In another aspect of the present invention the method further includes marking the card if the mutator modifies an object pointer of an object in the card.

In another aspect of the present invention any of steps a)-g) are performed concurrently.

In another aspect of the present invention any of steps h)-j) are performed concurrently.

In another aspect of the present invention either of steps a) and f) are performed for a given object only if the card to which the object belongs is not marked.

In another aspect of the present invention the method further includes marking the card only if there is at least one marked object already on the card.

In another aspect of the present invention the method further includes periodically unmarking any marked card that does not contain at least one of the marked objects.

In another aspect of the present invention the method further includes designating any of the objects as "new", and deferring the tracing of the "new" objects during any cycle of a plurality of cycles during which any of steps a)-g) are performed.

In another aspect of the present invention the designating as "new" step is performed if the object is part of an allocation cache from which objects are currently being allocated.

In another aspect of the present invention the method further includes periodically unmarking any marked card containing only "new" objects, and removing the "new" objects' "new" designation.

In another aspect of the present invention the periodically unmarking and removing steps are performed if the object is part of an allocation cache from which objects are not currently being allocated.

In another aspect of the present invention a method is provided for collecting garbage in a computing environment, the method including a) tracing a root object to any of its reachable objects in a population of objects, b) marking any of the objects referred to in step a), c) unmarking a marked card including any of the objects, d) tracing any marked object on the unmarked card to an unmarked referent object of the marked object, e) marking the unmarked referent object, f) tracing the referent object marked in step e) to any of its reachable objects, g) marking any of the objects referred to in step f), h) tracing any unmarked root object referent to any of its reachable objects, i) marking any of the objects referred to in step h), j) performing any of steps c)-g), and k) designating any unmarked object in the population of objects as available for reallocation, where either of steps a) and f) are performed for a given object only if the card to which the object belongs is not marked, where any of steps a)-g) are performed upon the population of objects concurrently with the operation of a mutator upon the population of objects within the computing environment, and where any of steps h)-k) are performed upon the population of objects while no mutator operates upon the population of objects within the computing environment.

In another aspect of the present invention the method further includes marking the card if the mutator modifies an object pointer of an object in the card.

In another aspect of the present invention any of steps a)-g) are performed concurrently.

In another aspect of the present invention any of steps h)-j) are performed concurrently.

In another aspect of the present invention a method is provided for collecting garbage in a computing environment, the method including a) tracing a root object to any of its reachable objects in a population of objects, b) marking any of the objects referred to in step a), c) unmarking a marked card including any of the objects, d) tracing any marked object on the unmarked card to an unmarked referent object of the marked object, e) marking the unmarked referent object, f) tracing the referent object marked in step e) to any of its reachable objects, g) marking any of the objects referred to in step f), h) tracing any unmarked root object referent to any of its reachable objects, i) marking any of the objects referred to in step h), j) performing any of steps c)-g), and k) designating any unmarked object in the population of objects as available for reallocation, where prior to the unmarking step c) the card is marked only if there is at least one marked object already on the card, where any of steps a)-g) are performed upon the population of objects concurrently with the operation of a mutator upon the population of objects within the computing environment, and where any of steps h)-k) are performed upon the population of objects while no mutator operates upon the population of objects within the computing environment.

In another aspect of the present invention the method further includes marking the card if the mutator modifies an object pointer of an object in the card.

In another aspect of the present invention any of steps a)-g) are performed concurrently.

In another aspect of the present invention any of steps h)-j) are performed concurrently.

In another aspect of the present invention a method is provided for collecting garbage in a computing environment, the method including a) tracing a root object to any of its reachable objects in a population of objects, b) marking any of the objects referred to in step a), c) unmarking a marked card including any of the objects, d) tracing any marked object on the unmarked card to an unmarked referent object of the marked object, e) marking the unmarked referent object, f) tracing the referent object marked in step e) to any of its reachable objects, g) marking any of the objects referred to in step f), h) tracing any unmarked root object referent to any of its reachable objects, i) marking any of the objects referred to in step h), j) performing any of steps c)-g), k) designating any unmarked object in the population of objects as available for reallocation, and l) prior to performing any of steps a)-g), periodically unmarking any marked card that does not contain at least one of the marked objects, where any of steps a)-g) are performed upon the population of objects concurrently with the operation of a mutator upon the population of objects within the computing environment, and where any of steps h)-k) are performed upon the population of objects while no mutator operates upon the population of objects within the computing environment.

In another aspect of the present invention the method further includes marking the card if the mutator modifies an object pointer of an object in the card.

In another aspect of the present invention any of steps a)-g) are performed concurrently.

In another aspect of the present invention any of steps h)-j) are performed concurrently.

In another aspect of the present invention a method is provided for collecting garbage in a computing environment, the method including a) tracing a root object to any of its reachable objects in a population of objects, b) marking any of the objects referred to in step a), c) unmarking a marked card including any of the objects, d) tracing any marked object on the unmarked card to an unmarked referent object of the marked object, e) marking the unmarked referent object, f) tracing the referent object marked in step e) to any of its reachable objects, g) marking any of the objects referred to in step f), h) tracing any unmarked root object referent to any of its reachable objects, i) marking any of the objects referred to in step h), j) performing any of steps c)-g), k) designating any unmarked object in the population of objects as available for reallocation, and l) during any cycle of a plurality of cycles during which steps a)-g) are performed designating any of the objects as "new", and deferring the tracing of the "new" objects, where any of steps a)-g) are performed upon the population of objects concurrently with the operation of a mutator upon the population of objects within the computing environment, and where any of steps h)-k) are performed upon the population of objects while no mutator operates upon the population of objects within the computing environment.

In another aspect of the present invention the method further includes marking the card if the mutator modifies an object pointer of an object in the card.

In another aspect of the present invention any of steps a)-g) are performed concurrently.

In another aspect of the present invention any of steps h)-j) are performed concurrently.

In another aspect of the present invention the designating as "new" step is performed if the object is part of an allocation cache from which objects are currently being allocated.

In another aspect of the present invention the method further includes periodically unmarking any marked card containing only "new" objects, and removing the "new" objects' "new" designation.

In another aspect of the present invention the periodically unmarking and removing steps are performed if the object is part of an allocation cache from which objects are not currently being allocated.

In another aspect of the present invention a system is provided for collecting garbage in a computing environment, the system including a) means for tracing a root object to any of its reachable objects in a population of objects, b) means for marking any of the objects referred to in a), c) means for unmarking a marked card including any of the objects, d) means for tracing any marked object on the unmarked card to an unmarked referent object of the marked object, e) means for marking the unmarked referent object, f) means for tracing the marked referent object marked in e) to any of its reachable objects, g) means for marking any of the objects referred to in f), h) means for tracing any unmarked root object referent to any of its reachable objects, i) means for marking any of the objects referred to in h), and j) means for designating any unmarked object in the population of objects as available for reallocation, where any of means a)-g) operate upon the population of objects concurrently with the operation of a mutator upon the population of objects within the computing environment, and where any of means h)-j) operate upon the population of objects while no mutator operates upon the population of objects within the computing environment.

In another aspect of the present invention the system further includes means for marking the card if the mutator modifies an object pointer of an object in the card.

In another aspect of the present invention any of means a)-g) operate concurrently.

In another aspect of the present invention any of means h)-i) operate concurrently.

In another aspect of the present invention either of tracing means a) and f) are operative to trace a given object only if the card to which the object belongs is not marked.

In another aspect of the present invention the system further includes means for marking the card only if there is at least one marked object already on the card.

In another aspect of the present invention the system further includes means for periodically unmarking any marked card that does not contain at least one of the marked objects.

In another aspect of the present invention the system further includes means for designating any of the objects as "new", and means for deferring the tracing of the "new" objects during any cycle of a plurality of cycles during which any of means a)-g) operate.

In another aspect of the present invention the means for designating as "new" is operative if the object is part of an allocation cache from which objects are currently being allocated.

In another aspect of the present invention the system further includes means for periodically unmarking any marked card containing only "new" objects, and means for removing the "new" objects' "new" designation.

In another aspect of the present invention the means for periodically unmarking and the means for removing are operative if the object is part of an allocation cache from which objects are not currently being allocated.

In another aspect of the present invention a system is provided for collecting garbage in a computing environment, the system including a) means for tracing a root object to any of its reachable objects in a population of objects, b) means for marking any of the objects referred to in a), c) means for unmarking a marked card including any of the objects, d) tracing any marked object on the unmarked card to an unmarked referent object of the marked object, e) marking the unmarked referent object, f) means for tracing the marked referent object in e) to any of its reachable objects, g) means for marking any of the objects referred to in f), h) means for tracing any unmarked root object referent to any of its reachable objects, i) means for marking any of the objects referred to in h), and j) means for designating any unmarked object in the population of objects as available for reallocation, where either of tracing means a) and f) trace a given object only if the card to which the object belongs is not marked, where any of means a)-g) operate upon the population of objects concurrently with the operation of a mutator upon the population of objects within the computing environment, and where any of means h)-j) operate upon the population of objects while no mutator operates upon the population of objects within the computing environment.

In another aspect of the present invention a system is provided for collecting garbage in a computing environment, the system including a garbage collector including a) means for tracing a root object to any of its reachable objects in a population of objects, b) means for marking any of the objects referred to in a), c) means for unmarking a marked card including any of the objects, d) tracing any marked object on the unmarked card to an unmarked referent object of the marked object, e) marking the unmarked referent object, f) means for tracing the marked referent object in e) to any of its reachable objects, g) means for marking any of the objects referred to in f), h) means for tracing any unmarked root object referent to any of its reachable objects, i) means for marking any of the objects referred to in h), and j) means for designating any unmarked object in the population of objects as available for reallocation, and a mutator operative to mark the card only if there is at least one marked object already on the card, where any of means a)-g) operate upon the population of objects concurrently with the operation of a mutator upon the population of objects within the computing environment, and where any of means h)-j) operate upon the population of objects while no mutator operates upon the population of objects within the computing environment.

In another aspect of the present invention a system is provided for collecting garbage in a computing environment, the system including a) means for tracing a root object to any of its reachable objects in a population of objects, b) means for marking any of the objects referred to in a), c) means for unmarking a marked card including any of the objects, d) tracing any marked object on the unmarked card to an unmarked referent object of the marked object, e) marking the unmarked referent object, f) means for tracing the marked referent object in e) to any of its reachable objects, g) means for marking any of the objects referred to in f), h) means for tracing any unmarked root object referent to any of its reachable objects, i) means for marking any of the objects referred to in h), j) means for designating any unmarked object in the population of objects as available for reallocation, and k) means for periodically unmarking any marked card that does not contain at least one of the marked objects, where any of means a)-g) operate upon the population of objects concurrently with the operation of a mutator upon the population of objects within the computing environment, and where any of means h)-j) operate upon the population of objects while no mutator operates upon the population of objects within the computing environment.

In another aspect of the present invention a system is provided for collecting garbage in a computing environment, the system including a) means for tracing a root object to any of its reachable objects in a population of objects, b) means for marking any of the objects referred to in a), c) means for unmarking a marked card including any of the objects, d) tracing any marked object on the unmarked card to an unmarked referent object of the marked object, e) marking the unmarked referent object, f) means for tracing the marked referent object in e) to any of its reachable objects, g) means for marking any of the objects referred to in f), h) means for tracing any unmarked root object referent to any of its reachable objects, i) means for marking any of the objects referred to in h), j) means for designating any unmarked object in the population of objects as available for reallocation, k) means for designating any of the objects as "new", and l) means for deferring the tracing of the "new" objects, where any of means a)-g) operate upon the population of objects concurrently with the operation of a mutator upon the population of objects within the computing environment, and where any of means h)-j) operate upon the population of objects while no mutator operates upon the population of objects within the computing environment.

In another aspect of the present invention a computer program is provided, embodied on a computer-readable medium, the computer program including a) a first code segment operative to trace a root object to any of its reachable objects in a population of objects, b) a second code segment operative to mark any of the objects referred to in a), c) a third code segment operative to unmark a marked card comprise any of the objects, d) a fourth code segment operative to trace any marked object on the unmarked card to an unmarked referent object of the marked object, e) a fifth code segment operative to mark the unmarked referent object, f) a sixth code segment operative to trace the marked referent object in e) to any of its reachable objects, g) a seventh code segment operative to mark any of the objects referred to in f), h) a eighth code segment operative to trace any unmarked root object referent to any of its reachable objects, i) a ninth code segment operative to mark any of the objects referred to in h), and j) a tenth code segment operative to designate any unmarked object in the population of objects as available for reallocation, where any of code segments a)-g) operate upon the population of objects concurrently with the operation of a mutator upon the population of objects within the computing environment, and where any of code segments h)-k) operate upon the population of objects while no mutator operates upon the population of objects within the computing environment.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
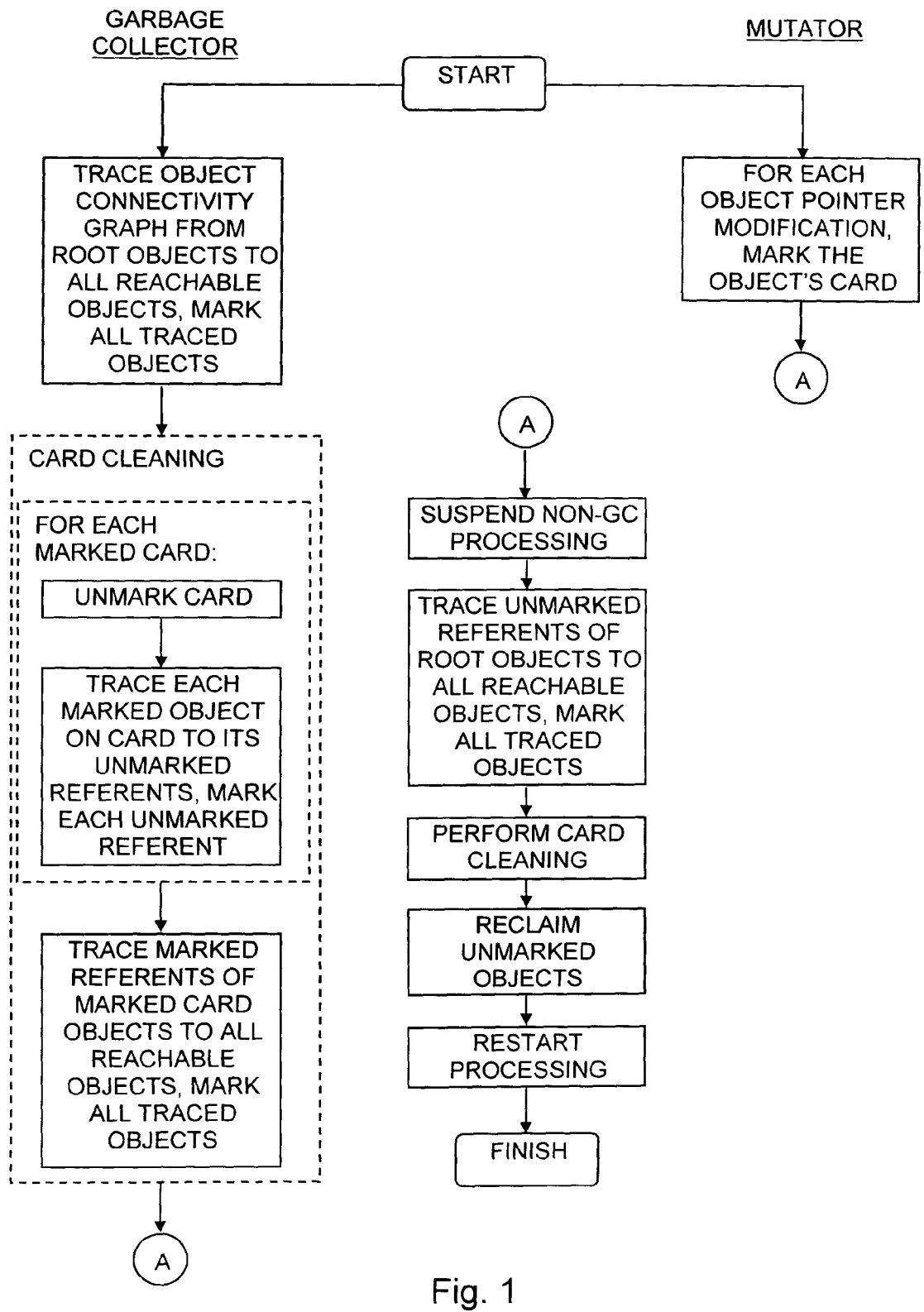
FIGS. 1-7 are simplified flowchart illustrations of concurrent garbage collection methods.

Reference is now made to FIG. 1, which is a simplified flowchart illustration of a concurrent garbage collection method. In the method of FIG. 1 a garbage collector (GC) is run in parallel with one or more mutators. During concurrent operation, as the mutator modifies an object pointer it marks the card where the object is found. Marking, as described herein, may be performed using any known means, such as by setting an object bit or byte value designated for GC marking purposes, or by storing objects' marks in a table. Preferably, no objects or cards are in a marked state prior to operation of the GC and the mutators. If the object spans cards, the mutator may mark the card where the object begins or, alternatively, where the modified pointer is located. Meanwhile, the GC forms an object connectivity graph by tracing root objects to their referents and their descendents, marking all reachable objects.

Once the object connectivity graph has been traced, or while it is being traced, card cleaning may be performed as follows. For each marked card, the GC unmarks the card and traces each marked object on the card to the object's direct referents only, marking each unmarked referent. Once all cards have been cleaned, or during the card cleaning process, the referent objects marked during card cleaning are traced to all their reachable objects, and all such objects are marked. Card cleaning and object connectivity graph tracing may be performed one or more times for a predetermined number of iterations or until free heap memory is exhausted.

Concurrent operation of the GC and the mutators ends with the mutator processes being suspended. The GC then traces all unmarked root object referents to their referents and their descendents, marking all reachable objects and performs a card cleaning pass. All unmarked objects may then be reclaimed, such as by listing them on a list of free objects available for reallocation. Concurrent operation of the GC and the mutators may then begin again, preferably once all objects and card marks are removed or reset.

Figure 2:
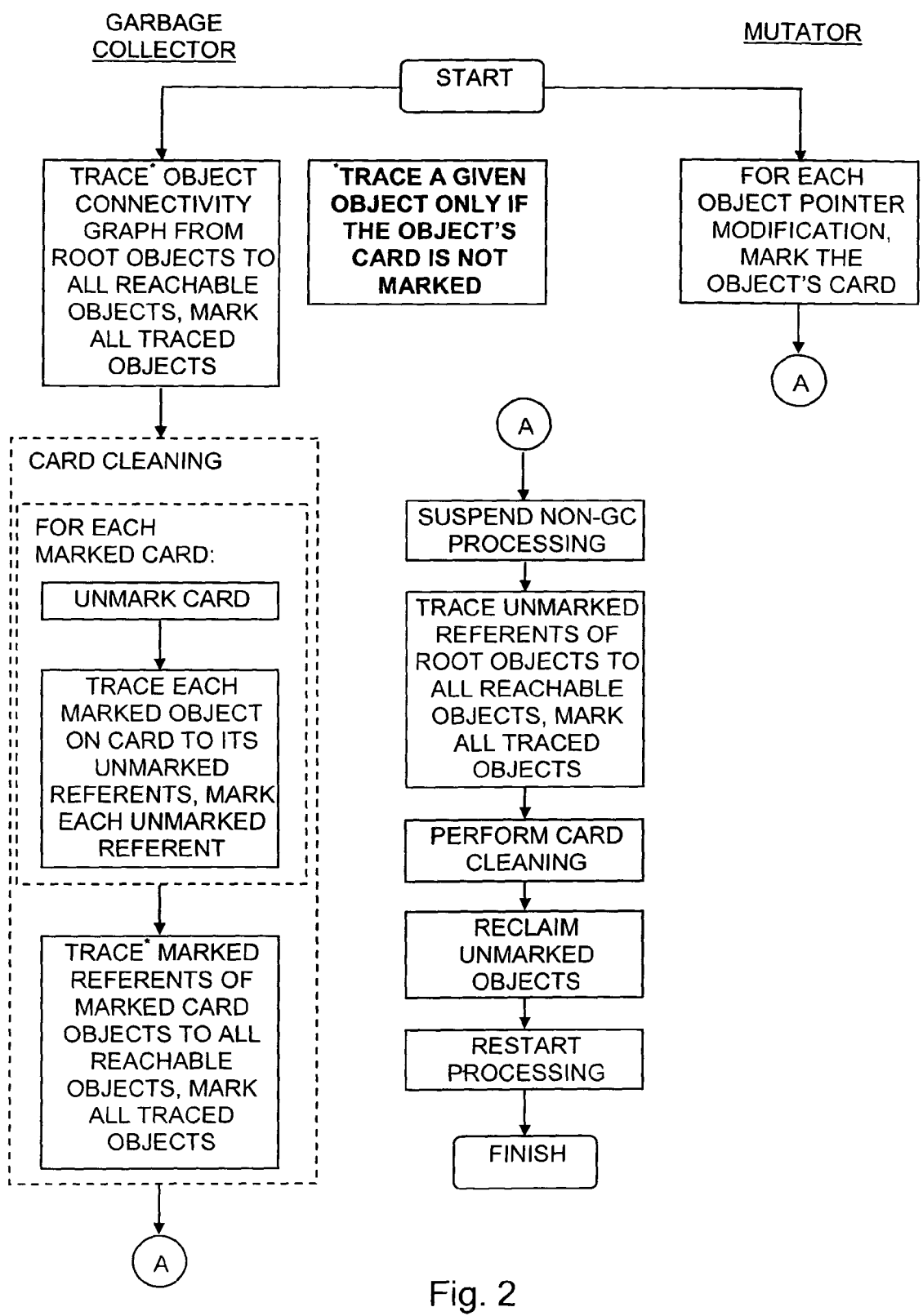

Reference is now made to FIG. 2, which is a simplified flowchart illustration of a concurrent garbage collection method. The method of FIG. 2 is similar to the method of FIG. 1 with the notable exception, shown in bold lettering, that during concurrent operation of the GC and the mutator, object tracing (where indicated by an asterisk) is performed for a given object only if the card to which the object belongs is not marked. This eliminates the need for the GC to trace marked objects on marked cards both during the object tracing from the root objects, as well as during card cleaning. This also delays the GC's tracing from the most active cards (i.e., those marked most often by the mutator), which may reduce the number of cache misses due to concurrent access by the GC and the mutator to the same memory locations, as well as reduce the amount of the "floating garbage," unused memory which can not be reclaimed by the GC.

Figure 3:
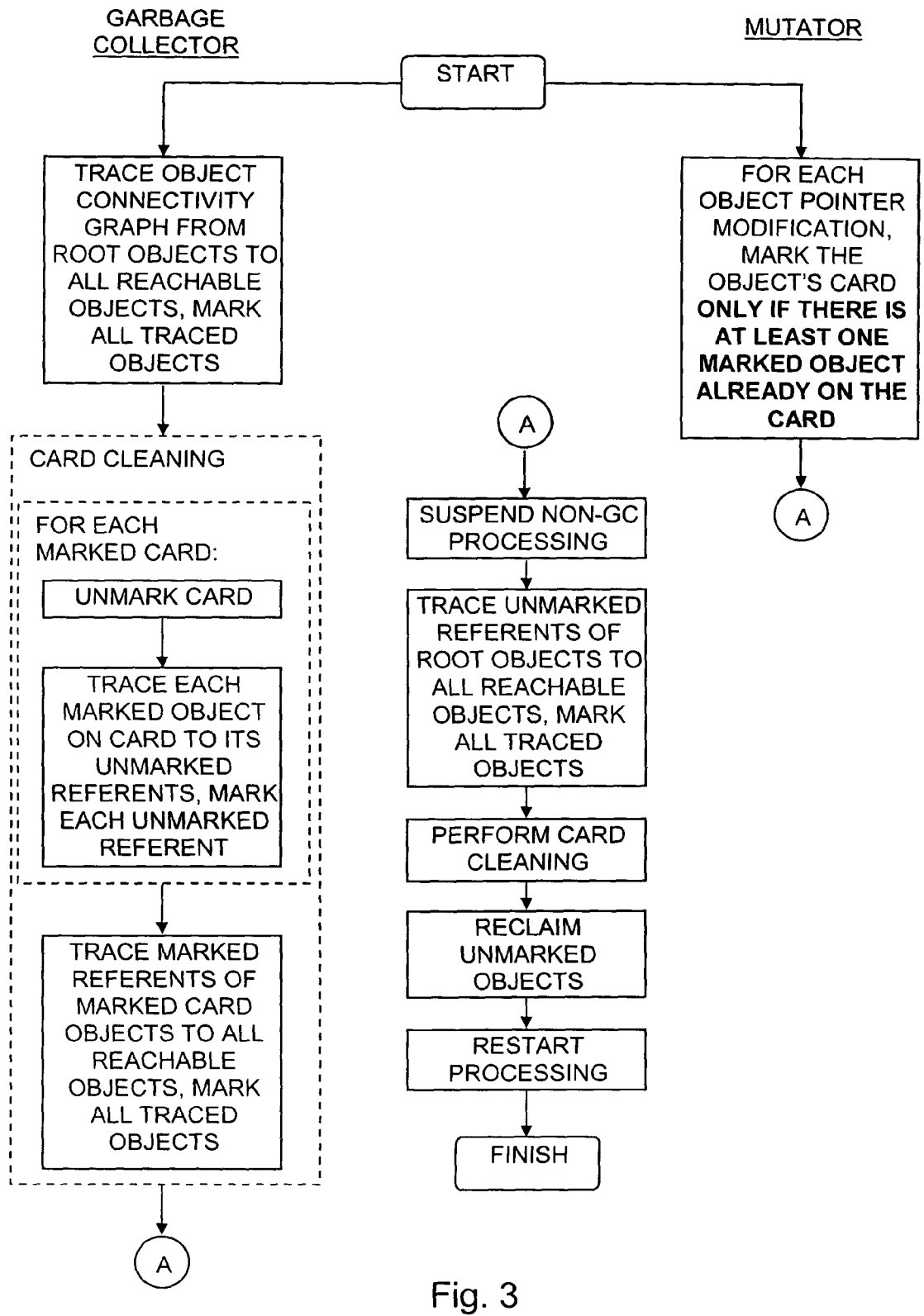
Figure 4:
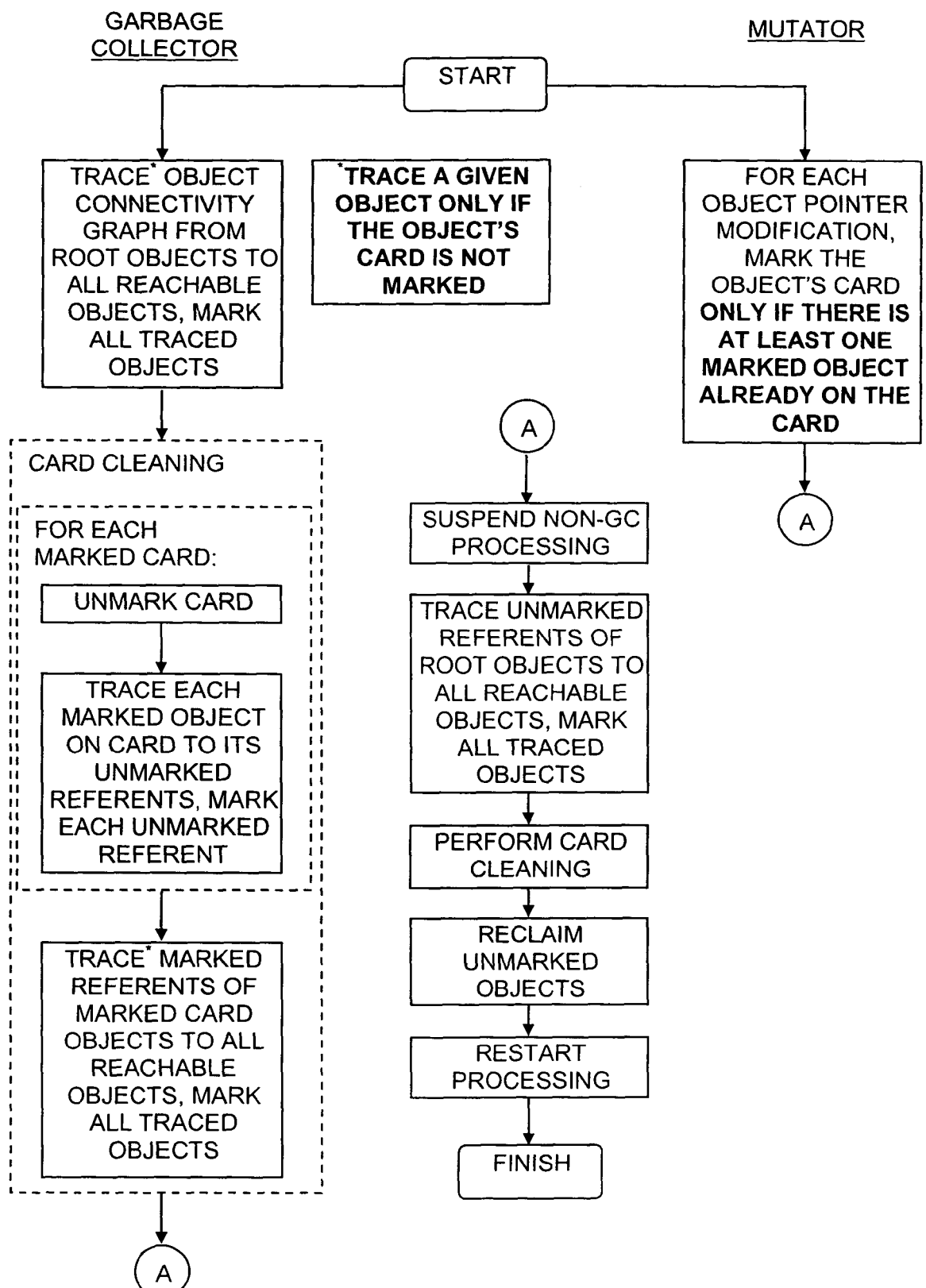

Reference is now made to FIG. 3, which is a simplified flowchart illustration of a concurrent garbage collection method. The method of FIG. 3 is similar to the method of FIG. 1 with the notable exception, shown in bold lettering, that the mutator only marks a card if there is at least one marked object already on the card. This reduces the amount of marked cards to be cleaned by the GC, thereby reducing the GC's work, shortening the duration of the stop-the-world phase, and reducing the number of cache misses during the concurrent operation of the GC and the mutators. The method of FIG. 3 may be combined with the method of FIG. 2, as is shown in FIG. 4.

Figure 5:
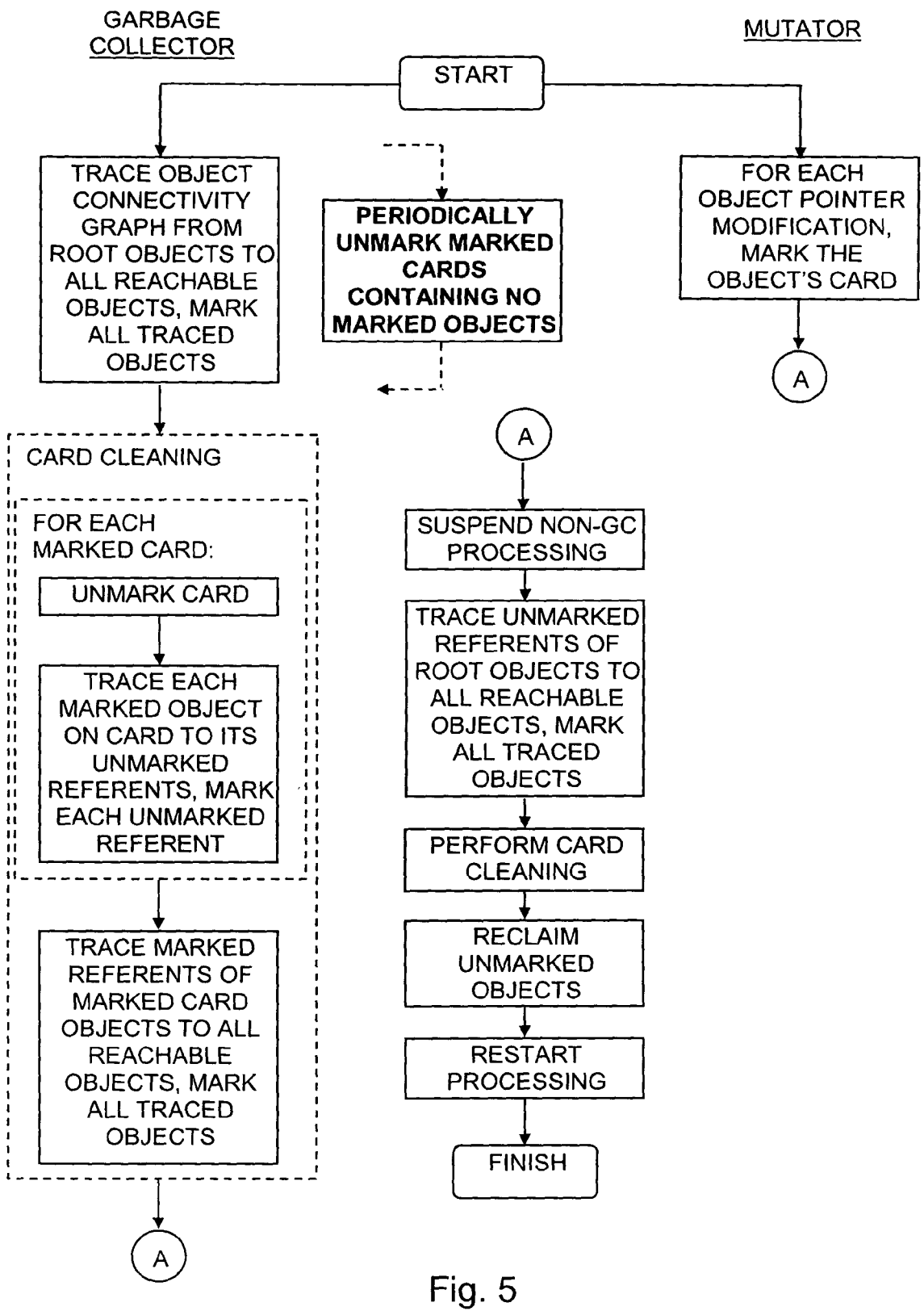
Figure 6:
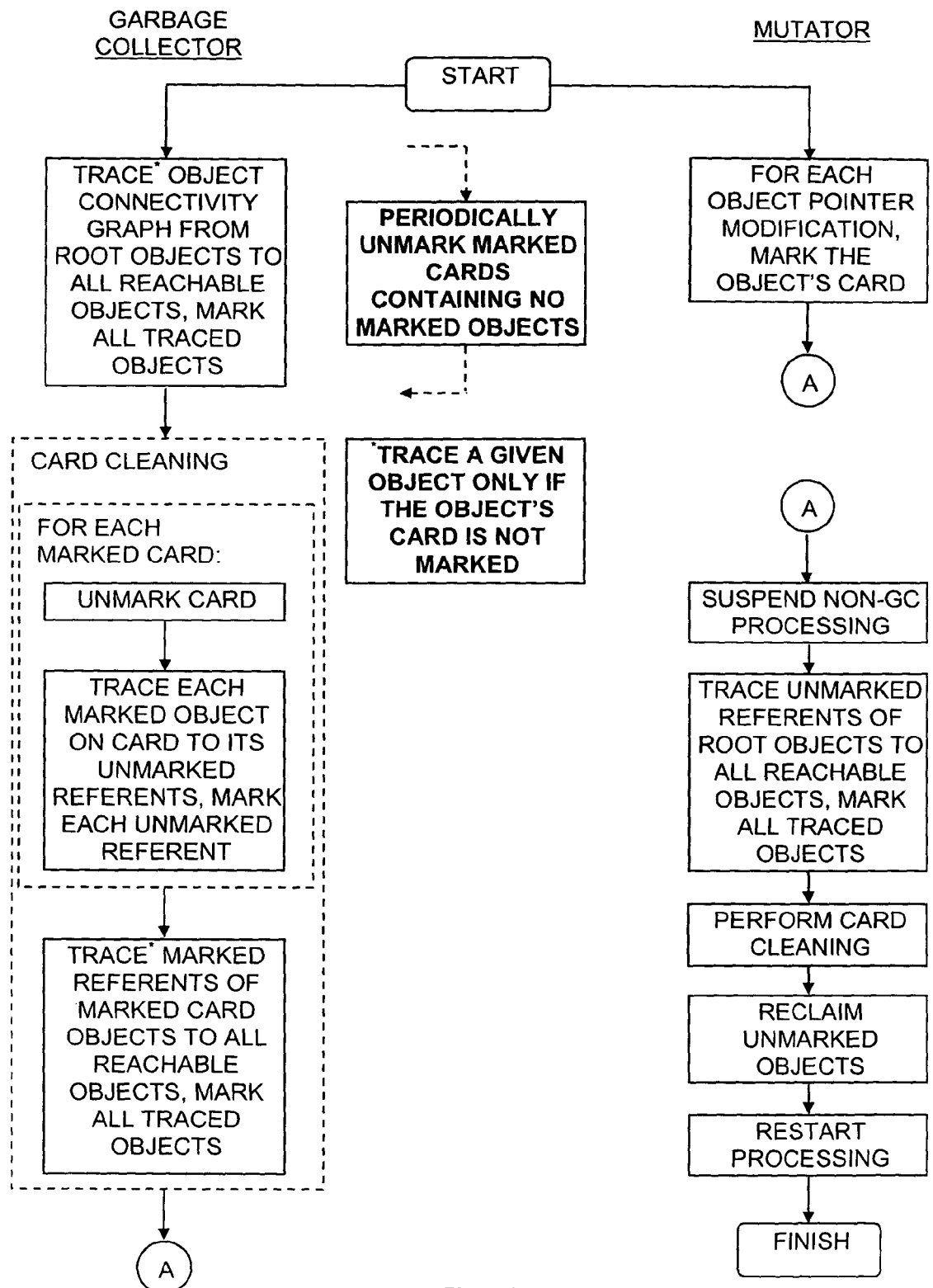

Reference is now made to FIG. 5, which is a simplified flowchart illustration of a concurrent garbage collection method. The method of FIG. 5 is similar to the method of FIG. 1 with the notable exception, shown in bold lettering, that according to a predetermined schedule, and at any time relative to the other functions performed by the GC, the GC periodically unmarks marked cards that contain no marked objects. This eliminates the need for the mutator to check whether a card contains marked objects before the mutator marks the card. The method of FIG. 5 may be combined with the method of FIG. 2, as is shown in FIG. 6.

Figure 7:
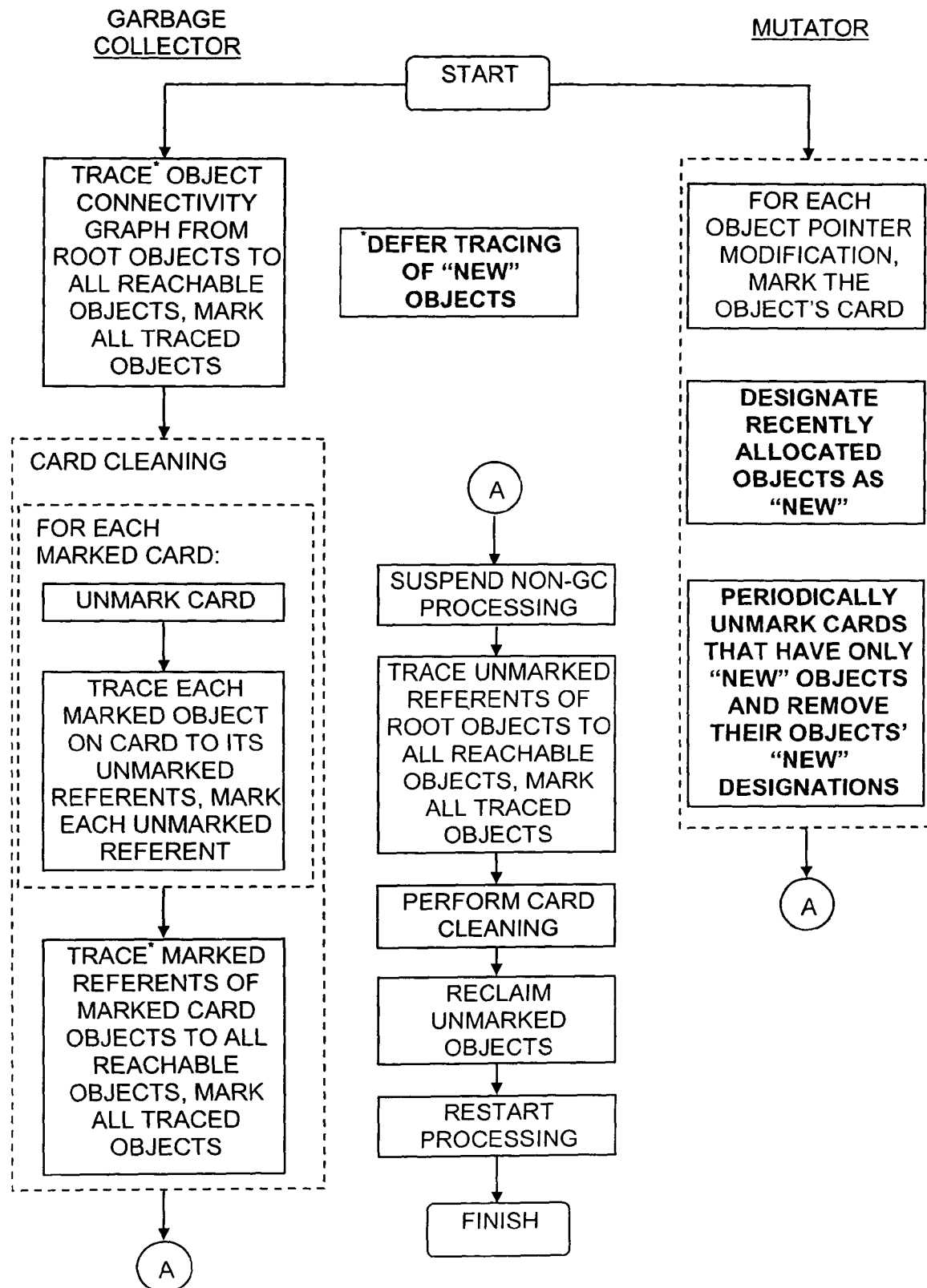

Reference is now made to FIG. 7, which is a simplified flowchart illustration of a concurrent garbage collection method. The method of FIG. 7 is similar to the method of FIG. 1 with several notable exceptions, shown in bold lettering. In the method of FIG. 7, objects that have recently been created by the mutator may be designated as "new" objects. For example, in the JAVA environment a mutator may be allocated a portion of memory known as an "allocation cache" that spans several cards from which the mutator allocates memory for objects it creates. Once the mutator has used up all of the allocation cache, it may receive another allocation cache, and so on. Thus, an object may be designated as "new" while it is part of an allocation cache from which the mutator is currently allocating memory for objects. Conversely, an object is no longer "new" if it is not part of an allocation cache from which the mutator is currently allocating memory for objects. The mutator may designate objects as "new" using any known marking technique.

Periodically, such as each time the mutator receives a new allocation cache, the mutator unmarks marked cards containing only "new" objects and removes the objects' "new" designation. For its part the GC defers the tracing of "new" objects, and traces them only once they lose their "new" designation. This reduces the number of marked cards to be cleaned by the GC, and, by delaying the tracing of newly allocated objects, reduces the number of cache misses and floating garbage. The method of FIG. 7 may be combined with any of the methods described herein above.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for collecting garbage in a computing environment, the method comprising:
    a) tracing a root object to any of its reachable objects in a population of objects;
    b) marking any of said objects referred to in step a);
    c) tracing any of said marked objects to an unmarked referent object of said marked object;
    d) marking said unmarked referent object;
    e) tracing said referent object marked in step d) to any of its reachable objects;
    f) marking any of said objects referred to in step e);
    g) tracing any unmarked root object referent to any of its reachable objects;
    h) marking any of said objects referred to in step g);
    i) performing any of steps c)-f); and
    j) designating any unmarked object in said population of objects as available for reallocation,
    wherein either of steps a) and e) are performed for a given object only if the card to which the object belongs is not marked, wherein any of steps a)-f) are performed upon said population of objects concurrently with the operation of a mutator upon said population of objects within said computing environment, and wherein any of steps g)-j) are performed upon said population of objects while no mutator operates upon said population of objects within said computing environment.

2. A method according to claim 1 and further comprising marking said card if said mutator modifies an object pointer of an object in said card.

3. A method according to claim 1 wherein any of steps a)-f) are performed concurrently.

4. A method according to claim 1 wherein any of steps g)-i) are performed concurrently.

5. A method for collecting garbage in a computing environment, the method comprising:
    a) tracing a root object to any of its reachable objects in a population of objects;
    b) marking any of said objects referred to in step a);
    c) tracing any of said marked objects to an unmarked referent object of said marked object;
    d) marking said unmarked referent object;
    e) tracing said referent object marked in step d) to any of its reachable objects;
    f) marking any of said objects referred to in step e);
    g) tracing any unmarked root object referent to any of its reachable objects;
    h) marking any of said objects referred to in step g);
    i) performing any of steps c)-f);
    j) designating any unmarked object in said population of objects as available for reallocation; and
    k) at any time while performing concurrently any of steps a)-f), periodically determining whether a marked card contains at least one of said marked objects, and unmarking any marked card about which it is determined that it does not contain at least one of said marked objects,
    wherein any of steps a)-f) are performed upon said population of objects concurrently with the operation of a mutator upon said population of objects within said computing environment, and wherein any of steps g)-j) are performed upon said population of objects while no mutator operates upon said population of objects within said computing environment.

6. A method according to claim 5 and further comprising: designating any of said objects as "new"; and
    deferring the tracing of said "new" objects during any cycle of a plurality of cycles during which any of steps a)-f) are performed.

7. A method according to claim 6 wherein said designating as "new" step is performed if said object is part of an allocation cache from which objects are currently being allocated.

8. A method according to claim 6 and further comprising:
    periodically unmarking any marked card containing only "new" objects; and
    periodically removing said "new" objects'"new" designation.

9. A method according to claim 8 wherein said periodically unmarking and periodically removing steps are performed if said object is part of an allocation cache from which objects are not currently being allocated.

10. A method according to claim 5 and further comprising marking said card if said mutator modifies an object pointer of an object in said card.

11. A method according to claim 5 wherein any of steps a)-f) are performed concurrently.

12. A method according to claim 5 wherein any of steps g)-i) are performed concurrently.

13. A system for collecting garbage in a computing environment, the system comprising:
    a) means for tracing a root object to any of its reachable objects in a population of objects;
    b) means for marking any of said objects referred to in a);
    c) means for tracing any of said marked objects to an unmarked referent object of said marked object;
    d) means for marking said unmarked referent object;
    e) means for tracing said marked referent object in d) to any of its reachable objects;
    f) means for marking any of said objects referred to in e);
    g) means for tracing any unmarked root object referent to any of its reachable objects;
    h) means for marking any of said objects referred to in g); and
    i) means for designating any unmarked object in said population of objects as available for reallocation,
    wherein either of tracing means a) and e) trace a given object only if the card to which the object belongs is not marked, wherein any of means a)-f) operate upon said population of objects concurrently with the operation of a mutator upon said population of objects within said computing environment, and wherein any of means g)-i) operate upon said population of objects while no mutator operates upon said population of objects within said computing environment.

14. A system for collecting garbage in a computing environment, the system comprising:

a) means for tracing a root object to any of its reachable objects in a population of objects;
b) means for marking any of said objects referred to in a);
c) means for tracing any of said marked objects to an unmarked referent object of said marked object;
d) means for marking said unmarked referent object;
e) means for tracing said marked referent object in d) to any of its reachable objects;
f) means for marking any of said objects referred to in e);
g) means for tracing any unmarked root object referent to any of its reachable objects;
h) means for marking any of said objects referred to in g);
i) means for designating any unmarked object in said population of objects as available for reallocation; and
j) means for periodically determining at any time concurrently with the operation of any of means a)-f) whether a marked card contains at least one of said marked objects, and unmarking any marked card about which it is determined that it does not contain at least one of said marked objects,
wherein any of means a)-f) operate upon said population of objects concurrently with the operation of a mutator upon said population of objects within said computing environment, and wherein any of means g)-i) operate upon said population of objects while no mutator operates upon said population of objects within said computing environment.

15. A system according to claim 14 and further comprising:
means for designating any of said objects as "new"; and
means for deferring the tracing of said "new" objects during any cycle of a plurality of cycles during which any of means a)-f) operate.

16. A system according to claim 15 wherein said means for designating as "new" is operative if said object is part of an allocation cache from which objects are currently being allocated.

17. A system according to claim 15 and further comprising:
means for periodically unmarking any marked card containing only "new" objects; and
means for removing said "new" objects'"new" designation.

18. A system according to claim 17 wherein said means for periodically unmarking and said means for removing are operative if said object is part of an allocation cache from which objects are not currently being allocated.

19. A computer program embodied on a computer-readable medium, the computer program comprising:
a) a first code segment operative to trace a root object to any of its reachable objects in a population of objects;
b) a second code segment operative to mark any of said objects referred to in a);
c) a third code segment operative to trace any of said marked objects to an unmarked referent object of said marked object;
d) a fourth code segment operative to mark said unmarked referent object;
e) a fifth code segment operative to trace said marked referent object in d) to any of its reachable objects;
f) a sixth code segment operative to mark any of said objects referred to in e);
g) a seventh code segment operative to trace any unmarked root object referent to any of its reachable objects;
h) a eighth code segment operative to mark any of said objects referred to in g); and
i) a ninth code segment operative to designate any unmarked object in said population of objects as available for reallocation,
wherein either of said code segments a) and e) are operative to trace a given object only if the card to which the object belongs is not marked, wherein any of said code segments a)-f) operate upon said population of objects concurrently with the operation of a mutator upon said population of objects within said computing environment, and wherein any of said code segments g)-i) operate upon said population of objects while no mutator operates upon said population of objects within said computing environment.

20. A method for collecting garbage in a computing environment, the method comprising:
a) a first code segment operative to trace a root object to any of its reachable objects in a population of objects;
b) a second code segment operative to mark any of said objects referred to in a);
c) a third code segment operative to trace any of said marked objects to an unmarked referent object of said marked object;
d) a fourth code segment operative to mark said unmarked referent object;
e) a fifth code segment operative to trace said marked referent object in d) to any of its reachable objects;
f) a sixth code segment operative to mark any of said objects referred to in e);
g) a seventh code segment operative to trace any unmarked root object referent to any of its reachable objects;
h) a eighth code segment operative to mark any of said objects referred to in g);
i) a ninth code segment operative to designate any unmarked object in said population of objects as available for reallocation; and
j) an tenth code segment operative at any time concurrent to the operation of any of said code segments a)-f), to periodically determine whether a marked card contains at least one of said marked objects, and unmark any marked card about which it is determined that it does not contain at least one of said marked objects,
wherein any of said code segments a)-f) are operative upon said population of objects concurrently with the operation of a mutator upon said population of objects within said computing environment, and wherein any of said code segments g)-i) are operative upon said population of objects while no mutator operates upon said population of objects within said computing environment.

* * * * *